ized Patent

United States Patent
Johnson

[15] 3,639,265
[45] Feb. 1, 1972

[54] METHANE FOR REGENERATING ACTIVATED CARBON

[72] Inventor: Homer R. Johnson, Charleston, S.C.
[73] Assignee: Westvaco Corporation, New York, N.Y.
[22] Filed: Mar. 13, 1970
[21] Appl. No.: 19,501

[52] U.S. Cl. ............................252/411 R, 23/2 S, 23/178, 23/181, 23/226, 55/73, 252/411 S
[51] Int. Cl. ...................................B01d 15/06, B01j 11/02
[58] Field of Search..........................252/411; 23/2.1; 55/73; 23/178, 181, 209, 226

[56] References Cited

UNITED STATES PATENTS

| 3,284,158 | 11/1966 | Johswich | 55/73 X |
| 3,345,125 | 10/1967 | Kruel et al. | 23/2 |

FOREIGN PATENTS OR APPLICATIONS

| 1,045,610 | 10/1966 | Great Britain | 252/411 |

Primary Examiner—Daniel E. Wyman
Assistant Examiner—P. E. Konopka
Attorney—Ernest B. Lipscomb and Robert S. Grimshaw

[57] ABSTRACT

In a process where sulfur oxides have been removed from gas streams by adsorption onto activated carbon in the form of sulfuric acid, regeneration of the sulfuric acid laden activated carbon is accomplished in two stages by first contact the carbon at a temperature below 570° F. with hydrogen sulfide to form sulfur dioxide, which is recovered, and elemental sulfur which remains adsorbed on the carbon. The carbon with elemental sulfur adsorbed thereon is then contacted in the second stage with methane or natural gas at temperatures between from 800° to 1,300° F. to form hydrogen sulfide for the first stage and carbon disulfide. The addition of water, as steam, to the second stage converts the carbon disulfide to additional amounts of hydrogen sulfide for use in the first stage.

2 Claims, No Drawings

METHANE FOR REGENERATING ACTIVATED CARBON

BACKGROUND OF THE INVENTION

This invention relates to a process for regenerating activated carbon for use in a sulfur oxide adsorbing process. More specifically, this invention relates to an improved process for regenerating sulfuric acid laden activated carbon by reducing the sulfuric acid with hydrogen sulfide and then contacting with methane or natural gas to eliminate use of the activated carbon adsorbent as a reductant.

In a dry process using activated carbon for removing low concentrations of sulfur dioxide and sulfur trioxide from flue gas streams, such as from powerplants, the gas stream is contacted with an activated carbon in the adsorber where the sulfur dioxide is catalytically oxidized to sulfur trioxide and the sulfur trioxide is then hydrolyzed to sulfuric acid which adsorbs onto the activated carbon. In the normal combustion of fuels there are present in the flue gas amounts of oxygen and water in excess of that needed to accomplish the oxidation of sulfur dioxide to sulfur trioxide and the hydrolysis of sulfur trioxide to form sulfuric acid.

Several processes for regenerating the carbonaceous adsorbents have been proposed, but each process is unsatisfactory for one reason or another. One process proposes the regeneration of sulfuric acid laden activated carbon by washing. The difficulty with this process is that large amounts of water are needed, resulting in a voluminous stream of dilute sulfuric acid. Another proposed process is to heat the sulfur acid laden carbonaceous adsorbent to form a concentrated stream of sulfur dioxide and carbon dioxide. A disadvantage of this regeneration process is that the carbonaceous adsorbent is used as the reducing agent thereby "burning-off" large amounts of carbonaceous material which must be replaced.

An improved regeneration process is set forth in copending application Ser. No. 752,298 filed Aug. 13, 1968. This regeneration process virtually eliminates the difficulties of these earlier processes by contacting in a two-stage process a sulfuric acid laden activated carbon adsorbent with hydrogen sulfide at elevated temperatures to form a recoverable stream of concentrated sulfur dioxide, i.e., 40-50 percent, eliminate carbon burn-off and leave elemental sulfur on the activated carbon adsorbed for treatment in the second stage. In the second regeneration stage, hydrogen is reacted with the elemental sulfur to form hydrogen sulfide for use in the first stage. The activated carbon is thus completely regenerated for recycling producing desirable byproducts without activated carbon "burn-off."

This invention is an improvement on the second stage of the above-described regeneration process. It is therefore a general object of this invention to provide an improved process for removing sulfur dioxide and sulfur trioxide from gas streams thereby eliminating sulfur oxide air pollution. A more specific object is to provide an improved process for regenerating sulfuric acid laden activated carbon. Another object is to provide an improved two-stage process for regenerating sulfuric acid laden activated carbon by contacting the carbon with hydrogen sulfide in the first stage to form sulfur dioxide and elemental sulfur, recovering the sulfur dioxide and subsequently contacting in the second stage the activated carbon adsorbent having elemental sulfur adhered thereto with methane or natural gas to convert the sulfur to hydrogen sulfide. A further object is to provide an improved economical process for regenerating activated carbon without consuming the carbon during regeneration. Further objects, features and advantages of this invention will be evident from the following disclosure.

SUMMARY OF THE INVENTION

It has been found that methane or a methane containing gas, such as natural gas or methane producing hydrocarbon, may be used in place of hydrogen in the second stage of the above-described two-stage regeneration process to react in an overall reaction with adsorbed sulfuric acid according to this reaction:

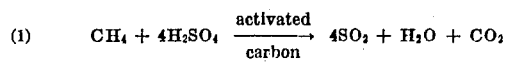

(1) $$CH_4 + 4H_2SO_4 \xrightarrow{\text{activated carbon}} 4SO_2 + H_2O + CO_2$$

This overall reaction can be considered as a reducing gas reacting with sulfuric acid to produce sulfur dioxide. However, the overall reaction takes place in two stages as will be explained hereinafter. It has also been found that the addition of water, as steam, to the second stage of regeneration converts carbon disulfide produced by the reaction of methane and sulfur to additional amounts of hydrogen sulfide for use in the first stage of regeneration.

DETAILED DESCRIPTION OF THE INVENTION

Flue gas containing low concentrations of sulfur dioxide and sulfur trioxide is passed countercurrent to the continuously moving carbon adsorbent and the sulfur oxides are adsorbed therefrom as sulfuric acid. Physical adsorption of sulfur dioxide by activated carbon at flue gas temperatures is very low, but sulfur trioxide by comparison is readily adsorbed in the presence of water. Satisfactory removal of sulfur dioxide from gas streams depends upon the carbon acting as a catalyst in the oxidation to sulfur trioxide, which is hydrolyzed to sulfuric acid if water vapor is present in the flue gas. The oxygen and water vapor necessary for the reaction are normally present in the flue gas, but they may be added if needed. The sulfuric acid thus formed is retained on the carbon surface and in this manner sulfur oxides are removed from the gas stream.

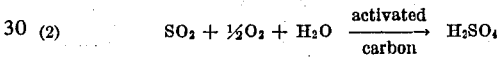

(2) $$SO_2 + \tfrac{1}{2}O_2 + H_2O \xrightarrow{\text{activated carbon}} H_2SO_4$$

The sulfur oxide removal efficiency of the process can be designed to be as high as required, for example, the gas stream as it passes to the atmosphere may be reduced to less than 5 p.p.m. of sulfur from an initial concentration of 1,000 to 50,000 p.p.m. However, for economic reasons, it is usually preferable to adsorb about 90 percent of the sulfur oxides from the gas stream. One of the advantages of an activated carbon process is that sulfur oxide adsorption may be performed at flue gas temperature. Consequently, adsorption of sulfur oxides may take place at temperatures up to about 350° F. The preferred temperature for sulfur oxide adsorption is between 200° and 260° F. in order to retain buoyancy.

Any carbonaceous adsorbent may be used in the process of this invention, but an activated carbon is preferred. Since the regeneration procedure does not consume the activated carbon adsorbent, a highly activated, more effective hard carbon, such as those disclosed in copending application Ser. No. 734,566, may be used. Through the ability to use the more highly activated carbons, the throughput of gas per volume of carbon can be increased by five to seven times; compared to activated char. This achievement means a significant reduction in the size of the adsorption equipment required for a sulfur dioxide recovery process. In addition, hard activated carbons are much less subject to abrasion than are chars, the result being lower attrition losses.

In the first stage, regeneration is efficiently carried out by using hydrogen sulfide for recovering sulfur dioxide and sulfur from the sulfuric acid laden activated carbon. Although a number of reactions may be postulated under the proper regeneration conditions, the stoichiometry necessary for practicing this invention is generally described by the following reactions:

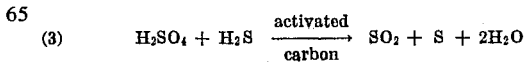

(3) $$H_2SO_4 + H_2S \xrightarrow{\text{activated carbon}} SO_2 + S + 2H_2O$$

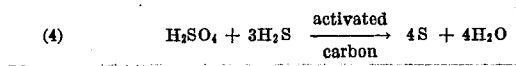

(4) $$H_2SO_4 + 3H_2S \xrightarrow{\text{activated carbon}} 4S + 4H_2O$$

The carbon burn-off during these reactions is negligible and the sulfur formed by reactions [3] and [4] remains adsorbed on the carbon surface. It is believed that the carbon acts as a catalyst not only for the adsorption of sulfur oxides but in the regeneration as well. The regeneration may be started at an ambient temperature with the evolution of sulfur dioxide beginning at approximately 350° F. and continuing upward. At temperatures below 350° F. reaction [4] predominates and sulfur remains adsorbed on the carbon. As the regeneration temperature is raised above 350° F. reaction [3] is favored and the percentage of sulfur dioxide evolved is increase. This reaction is controlled to produce the requisite amount of elemental sulfur for conversion in stage two. It has been shown that although regeneration may be carried out at temperatures above 570° F., complete sulfur trioxide and sulfuric acid reduction may be accomplished at temperatures below 570° F. The sulfur dioxide formed is continuously purged and conveyed from the regenerator to further processing for sale as indicated above.

Elemental sulfur is then removed from the activated carbon in the second stage of regeneration by direct reaction with methane or a methane containing gas, such as natural gas or methane producing hydrocarbons, according to reaction [5]:

(5) $\quad CH_4 + 4S \xrightarrow{\text{activated carbon}} CS_2 + 2H_2S$

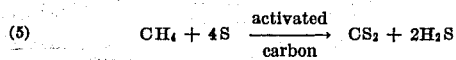

The hydrogen sulfide formed by this reaction is carried to the first regenerator for use in reactions [3] and [4]. The thus completely regenerated activated carbon adsorbent is then recycled without any loss in effectiveness for adsorption of sulfur oxides. It is desirable to carry out reaction [5] at temperatures above 500° F. It has been found that temperatures between 800° F. and 1,300° F. satisfactorily remove the sulfur at a sufficiently short reaction time, but lower temperatures may be used if sufficient reaction time is allowed. The complete regeneration thus encompasses the chemical reduction of adsorbed sulfur trioxide or sulfuric acid to sulfur dioxide and adsorbed elemental sulfur by hydrogen sulfide and the subsequent reaction of adsorbed elemental sulfur with methane to form hydrogen sulfide.

If the adsorbed sulfur is removed according to reaction [5], the amount of hydrogen sulfide is less than that required in the first stage of regeneration. The amount of hydrogen sulfide necessary for complete reduction of sulfuric acid in stage one may be supplied from an external source or it is possible to convert a sufficient amount of the carbon disulfide formed during reaction [5] by injecting steam along with the methane according to reaction [6]:

(6) $\quad CS_2 + 2H_2O \xrightarrow{\text{activated carbon}} 2H_2S + CO_2$

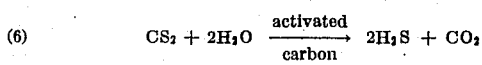

The equilibrium conversion is almost complete in the temperature range from 260° to 1,300° F., preferably about 800° F. Activated charcoal give a conversion of 83 percent at 748° F. and a space velocity of 850 bed volumes per hour. The amount of water vapor necessary to give maximum conversion need be only slightly above the theoretical amount. By mixing water vapor, methane and sulfur vapor, and passing the mixture through the activated carbon bed hydrogen sulfide can be obtained in one reaction zone instead of having two zones operating at different temperatures. This procedure would not be desirable if the steam and/or carbon dioxide react with the activated carbon; however, at the temperatures of regeneration, these reactions do not proceed to an appreciable extent.

In evaluating the methane requirement for the second stage of regeneration, it is considered that methane reacts with adsorbed sulfur according to equation [5] and that the carbon disulfide formed by this reaction is converted to hydrogen sulfide and carbon dioxide according to reaction [6]. Thus, the overall reaction for the second stage of regeneration can be written as:

(7) $\quad CH_4 + 4S + 2H_2O \xrightarrow{\text{activated carbon}} 4H_2S + CO_2$

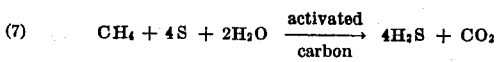

or (8) $\quad \frac{(3n-1)}{8} CH_4 + \frac{(3n-1)}{2} S + \frac{(3n-1)}{4} H_2O \xrightarrow{\text{activated carbon}} \frac{(3n-1)}{2} H_2S + \frac{(3n-1)}{8} CO_2$

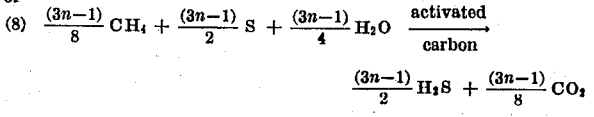

If reactions [3] and [8] are added, it can be seen that the overall reaction for both stages of regeneration is:

(9) $\quad \frac{(3n-1)}{8} CH_4 + H_2SO_4 \xrightarrow{\text{activated carbon}} \frac{(3-n)}{2} SO_2 + \frac{(n-1)}{2} H_2S + \frac{(3n-1)}{8} CO_2 + \frac{(n+5)}{4} H_2O$

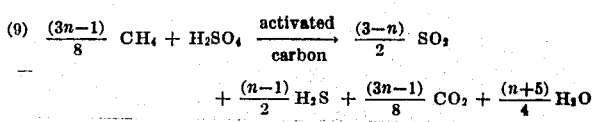

Examination of reaction [9] indicates that $n$ can range from 1 to 3 with the product distribution and the methane requirement depending upon the value of $n$. A value of 1 for $n$ results in the minimum methane requirement and sulfur dioxide for the final product. For this value of $n$, the $CH_4:H_2SO_4$ ratio is 1/4:1. If hydrogen sulfide is the desired product, the value of $n$ is 3 which results in a $CH_4:H_2SO_4$ ratio of 1:1. The methane requirement is the same whether steam reformation is used to produce hydrogen or whether methane is used in a direct reaction with adsorbed sulfur. Of course, if methane can be used directly, the reforming equipment is not required.

The advantages offered by this invention include the ability to use a process whereby burn-off of activated carbon may be virtually eliminated and methane reforming equipment is not required. Since carbon burn-off is eliminated, a second advantage is the ability to use an activated carbon possessing superior adsorption-rate and capacity characteristics. Regeneration by chemical reduction has the further advantage of producing a stream concentrated in sulfur dioxide which can be further processed to such products as liquid sulfur dioxide, sulfuric acid or sulfur. The adsorption and regeneration may be carried out in a fixed bed system of a continuously moving bed system, but the preferred process utilizes a fluidized bed system.

The practice of this invention may clearly be seen in the following examples.

EXAMPLE 1

Experiments were conducted with a coal-based activated carbon having a mesh size of 14×40 containing adsorbed sulfur to study the effect of temperature upon sulfur removal for temperatures ranging from 800° to 1,300° F. during the second stage of regeneration. These runs were made in a 1½-inch-diameter, fixed bed, regenerator at various space velocities using an inlet gas stream containing 45% $CH_4$/55% He. The conditions and results of the runs according to reaction [5] are given in the table.

EFFECT OF TEMPERATURE UPON SULFUR REMOVAL USING METHANE IN CARBON REGENERATION

| Run No. | Space velocity (vol. gas/ vol. c-hr.) | Maximum bed temperature (° F.) | Sulfur content of carbon | |
|---|---|---|---|---|
| | | | Before regen. (weight percent) | After regen. (weight percent) |
| 1 | 180 | 800 | 6.6 | 4.1 |
| 2 | 180 | 900 | 6.6 | 3.4 |
| 3 | 120 | 1000 | 9.7 | 3.4 |
| 4 | 120 | 1000 | 10.5 | 3.6 |
| 5 | 120 | 1070 | 10.0 | 2.7 |
| 6 | 150 | 1300 | 4.2 | 1.4 |

The results were obtained at different space velocities and initial sulfur contents and the reaction time at the maximum bed temperature was not the same for all runs. The results indicate that the sulfur content after regeneration can be decreased with increasing temperature and that the sulfur content can be reduced to at least 1.4 percent by regeneration at 1,300° F. Thus, it appears that acceptable sulfur removal can be obtained by regeneration at temperatures between 800° and 1,300° F.

EXAMPLE 2

The effect of space velocity at a temperature of 1,200° F. was investigated. It was felt that acceptable sulfur removal could be obtained at this temperature with only a small amount of methane being cracked. A 1-inch-diameter, fixed bed, quartz reactor was used. Three runs were made with a coal-based activated carbon containing 10 percent adsorbed sulfur using an inlet stream of 45% $CH_4$/55% He. The heating rate for these runs was programmed such that the maximum bed temperature, 1,200° F., was reached in 3 hours and this temperature was maintained for 1 additional hour. The conditions and results of the runs are given in the table.

| Run No. | Space velocity (vol. gas/ vol. c-hr.) | Sulfur content after regeneration (weight percent) | Recovered sulfur as $H_2S$ |
|---|---|---|---|
| 7 | 50 | 1.7 | 79.0 |
| 8 | 100 | 1.6 | 81.5 |
| 9 | 150 | 1.7 | 83.5 |

The results given in the above table indicate that the sulfur content is reduced to about 1.7 percent and that this value does not depend upon space velocity for the range studied. It is also indicated that approximately 80 percent of the sulfur removed was recovered as hydrogen sulfide and that the percentage increases slightly with increasing space velocity.

EXAMPLE 3

The effect of the addition of steam to the methane reaction was tried using the equipment of example 1. A stream of regeneration gas composed of 40% $CH_4$, 10% steam, and 50% He was contacted with an activated carbon containing 10 percent adsorbed sulfur at a temperature of 1,200° F. and a space velocity of 100 bed volumes per hour. The results showed that the sulfur content was reduced below 1.8 percent. Also, approximately 92.0 percent of the sulfur removed was recovered as hydrogen sulfide. This shows that all the hydrogen sulfide necessary for reduction of sulfuric acid in stage one may be supplied in the second stage. The remaining sulfur was removed in the form of sulfur dioxide, COS and $CS_2$.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

I claim:

1. In a two-stage process for regenerating a sulfuric acid laden carbonaceous adsorbent by first contacting said adsorbent with hydrogen sulfide to reduce said sulfuric acid to a member of the group consisting essentially of sulfur dioxide, elemental sulfur and mixtures thereof, recovering said sulfur dioxide while retaining said elemental sulfur on said adsorbent and second, contacting said carbonaceous adsorbent containing elemental sulfur adsorbed thereon with a gas from the group consisting essentially of methane and natural gas at a temperature between 500° and 1,300° F. to reduce said elemental sulfur to hydrogen sulfide and carbon disulfide, the improvement comprising, simultaneously with said second stage contacting said adsorbent with steam to convert said carbon disulfide to hydrogen sulfide for use in said first stage and carbon dioxide.

2. The process of claim 1 wherein said second stage is carried out at a temperature between 800° and 1,300° F.

* * * * *